UNITED STATES PATENT OFFICE.

JOSEPH H. McMAKEN, OF TOLEDO, OHIO, ASSIGNOR OF ONE-HALF TO JESSE SISSON, OF SAME PLACE.

ANTI-INCRUSTATION COMPOUND.

SPECIFICATION forming part of Letters Patent No. 662,956, dated December 4, 1900.

Application filed September 22, 1900. Serial No. 30,821. (No specimens.)

*To all whom it may concern:*

Be it known that I, JOSEPH H. McMAKEN, a citizen of the United States, residing at Toledo, in the county of Lucas and State of Ohio, have invented certain new and useful Improvements in Anti-Incrustation Compounds for Steam-Boilers; and I do declare the following to be a full, clear, and exact description of the invention, such as will enable others skilled in the art to which it appertains to make and use the same.

My compound comprises a number of ingredients, of which some operate to dissolve the incrustation, some act as absorbents of the lime and other scale-forming matter thus liberated or which are suspended in the water, while others adhere to the boiler-surfaces, forming a coating which resists the adhesion of scale-forming matter.

My compound is designed not only to cure but to also prevent the incrustation of boiler-surfaces.

My compound consists of the following ingredients: Caustic soda, ten pounds; wood-charcoal, ten pounds; gum-catechu, ten pounds; linseed-oil cake, ten pounds; oak-bark, five pounds, and best English soda-ash one hundred and fifty pounds. All these ingredients are thoroughly mixed together and reduced to powdered form by grinding or otherwise. My compound is now ready for use.

It should be understood that the proportions here stated assume that the ingredients are of the usual strength and purity of the articles named and as used in commerce. In case any of the ingredients are of less than the usual merchantable strength and purity the quantity of such ingredient should be proportionately increased.

The amount of the compound required will vary according to the condition of the boiler and the amount of scale-forming matter contained in the feed-water; but ordinarily in a boiler of two hundred and fifty to three hundred cubic feet scale may be prevented by the use of about five pounds each week of the compound and in the same proportion for boilers of less or greater size.

Boilers of, say, two hundred and fifty to three hundred cubic feet, already incrusted, will require eight to ten pounds in one or several applications, according to the thickness of scale and quality of feed-water used.

My compound may be conveniently applied by mixing the required quantity of the powder in water and introducing the same into the boiler with the feed-water.

Having described my invention, what I claim, and desire to secure by Letters Patent, is—

The anti-incrustation compound for boilers composed of the following ingredients, viz: caustic soda, wood-charcoal, gum-catechu, linseed-oil cake, oak-bark and English soda-ash, in substantially the proportions named, said ingredients being thoroughly mixed and reduced to powdered form.

In testimony whereof I affix my signature in presence of two witnesses.

JOSEPH H. McMAKEN.

Witnesses:
   WILBER A. OWEN,
   L. BROWN.